US008522817B1

(12) United States Patent
Jordan

(10) Patent No.: US 8,522,817 B1
(45) Date of Patent: Sep. 3, 2013

(54) APPARATUS AND METHOD FOR FAST RECOVERY AND CHARGE OF INSULATION GAS

(75) Inventor: Kevin Jordan, Newport News, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 402 days.

(21) Appl. No.: 12/930,089

(22) Filed: Dec. 28, 2010

(51) Int. Cl.
*E03B 5/00* (2006.01)
*B01D 53/48* (2006.01)

(52) U.S. Cl.
USPC ............ 137/565.17; 137/565.29; 174/17 GF; 174/16.1

(58) Field of Classification Search
USPC .................. 137/565.17, 565.29; 174/17 GF, 174/16.1; 361/604, 612, 608
See application file for complete search history.

(56) References Cited

U.S. PATENT DOCUMENTS

| | | | | |
|---|---|---|---|---|
| 3,614,355 | A * | 10/1971 | Boersma | 218/83 |
| 3,934,454 | A * | 1/1976 | Simo | 73/29.02 |
| 4,505,146 | A * | 3/1985 | Miners | 73/19.01 |
| 5,433,238 | A * | 7/1995 | Cannizzaro et al. | 137/565.29 |
| 7,029,519 | B2 * | 4/2006 | Uchii et al. | 174/17 GF |
| 7,777,994 | B2 * | 8/2010 | Magnier | 361/38 |
| 7,807,074 | B2 * | 10/2010 | Luly et al. | 252/67 |

* cited by examiner

*Primary Examiner* — Craig Schneider
*Assistant Examiner* — Craig J Price

(57) ABSTRACT

An insulation gas recovery and charge apparatus is provided comprising a pump, a connect, an inflatable collection device and at least one valve.

8 Claims, 2 Drawing Sheets

APPARATUS AND METHOD FOR FAST RECOVERY AND CHARGE OF INSULATION GAS

The United States government may have certain rights to this invention under Management and Operating Contract No. DE-AC05-06OR23177 from the Department of Energy

FIELD OF INVENTION

The present invention relates to an apparatus and method for fast recovery and charge of insulation gas in an electronic device.

BACKGROUND OF THE INVENTION

Sulfur hexafluoride ($SF_6$) has been used as a gaseous dielectric (insulator) in electrical equipment since the 1950s. It is now known that $SF_6$ is a potent greenhouse warming gas with one of the highest global warming potentials (GWP) known. The basic physical and chemical properties of $SF_6$, its behavior in various types of gas discharges, and its uses in electrical equipment have been broadly investigated.

Besides its good insulating and heat transfer properties, SF6 has a relatively high pressure when contained at room temperature. It is easily liquefied under pressure at room temperature allowing for compact storage in gas cylinders. However, the liquefaction process can be time consuming, inefficient and relatively expensive.

$SF_6$ has some other undesirable properties: it is an efficient infrared (IR) absorber and due to its chemical inertness, is not rapidly removed from the earth's atmosphere. Both of these properties make $SF_6$ a potent greenhouse gas. The strong infrared absorption of $SF_6$ and its long lifetime in the environment are the reasons for its extremely high global warming potential which for a 100-year time horizon is estimated to be more than 22,000 times greater (per unit mass) than that of $CO_2$, the predominant contributor to the greenhouse effect.

Accordingly, many in the electrical equipment industry have spent substantial time and effort seeking suitable replacement gases to reduce the use of $SF_6$ in electrical equipment. To date, the possible replacement gases have been identified as (i) mixtures of $SF_6$ and nitrogen for which a large amount of research results are available; (ii) gases and mixtures (e.g., low concentrations of $SF_6$ in $N_2$, and $SF_6$—He mixtures) for which a smaller yet significant amount of data is available; and (iii) other potential gases for which little experimental data is available, e.g., Arsenic pentafluoride; Arsine; diboron tetrafluoride; diborane, etc.

These compounds, including $SF_6$, are useful in the gas phase for electrical insulation and for arc quenching and current interruption equipment used in the transmission and distribution of electrical energy. Generally, there are four major types of electrical equipment devices where these gases can be employed for insulation and/or interruption purposes: (1) gas-insulated circuit breakers and current interruption equipment, (2) gas-insulated transmission lines, (3) gas-insulated transformers, and (4) gas-insulated substations. Such gas-insulated equipment is a major component of power transmission and distribution systems all over the world.

Regardless, of which insulation gas is used, including $SF_6$; all of the insulation gases have some amount of global warming potential. When the various types of electrical equipment discussed above require maintenance or when the electrical equipment is used under laboratory or experimental conditions there is a need for an apparatus and method for fast recovery and charge of the insulation gas. Particularly, methods that avoid time consuming and inefficient liquefaction steps. The present invention addresses these problems by avoiding liquefaction of the gas reducing the recovery and charge time of insulation gas from electrical equipment; reducing the cost of maintenance activity; and reducing the amount of escaped gas, thereby reducing the environmental impact of insulation gas recovery and charge in electrical equipment.

SUMMARY OF THE INVENTION

The present invention relates to an insulation gas recovery and charge apparatus comprising a pump, a connect, an inflatable collection device and at least one valve.

In another embodiment the insulation gas recovery and charge apparatus has at least one valve having a collection state and a charge state.

In another embodiment the insulation gas recovery and charge apparatus has at least one valve in communication with the inflatable collection device and the connect, where the connect is capable of connecting an electrical equipment device insulated with gas to the insulation gas recovery and charge apparatus.

In yet another embodiment of the invention the insulation gas recovery and charge apparatus has a connect capable of connecting to an electrical equipment device, the pump is capable of directing gas from the electrical equipment device to the inflatable collection device when the at least one valve is in the collection state and directs gas from the inflatable collection device to the electrical equipment device when the at least one valve is in the charge state.

In still another embodiment of the invention the insulation gas recovery and charge apparatus has a second pump in communication with the electrical equipment.

In another embodiment the insulation gas recovery and charge apparatus includes a filter.

In another embodiment the insulation gas recovery and charge apparatus includes a gas drying system.

In another embodiment the present invention relates to an insulation gas recovery and charge apparatus comprising a pump, a connect for connecting the insulation gas recovery and charge apparatus to an electrical equipment device insulated with a gas, an inflatable collection device, at least one valve having a collection state and a charge state, wherein the at least one valve is in communication with the inflatable collection device and the electrical equipment device when the connect is connected to an electrical equipment device, and wherein the pump is capable of directing the gas from the electrical equipment device to the inflatable collection device when the at least one valve is in the collection state and directing a gas from the inflatable collection device to the electrical equipment device when the at least one valve is in the charge state.

In still another embodiment, the present invention relates to a system for recovering and charging insulation gas comprising, connecting a gas recovery and charge apparatus as described previously through the connect to an electrical equipment device containing an insulation gas and removing the insulation gas from the electrical equipment device by operating the pump wherein the insulation gas is collected in the inflatable collection device.

In yet another embodiment the system for recovering and charging insulation gas further includes, returning the insulation gas into the electrical equipment device by operating the pump wherein the insulation gas is removed from the collection device and returned to the electrical equipment device.

In another embodiment of the system for recovering and charging insulation gas the insulation gas recovery and charge apparatus has at least one valve having a collection state and a charge state.

In another embodiment of the system for recovering and charging insulation gas the at least one valve is in selected communication with the gas collection device and an electrical equipment device.

In another embodiment of the system for recovering and charging insulation gas the pump is capable of directing a gas from the electrical equipment device to the gas collection device when the at least one valve is in the collection state and directing a gas from the collection device to the electrical equipment device when the at least one valve is in the charge state.

In another embodiment of the system for recovering and charging insulation gas the insulation gas recovery and charge apparatus further comprises a second pump in communication with the electrical equipment.

In yet another embodiment of the system for recovering and charging insulation gas the insulation gas recovery and charge apparatus includes a filter.

In yet another embodiment of the system for recovering and charging insulation gas the insulation gas recovery and charge apparatus includes a gas drying system.

In yet another embodiment of the system for recovering and charging insulation gas the insulation gas is selected from the group consisting of, arsenic pentafluoride; arsine; diboron tetrafluoride; diborane; perchloric acid, 2-chloro-1,1,2,2-tetrafluoroethyl ester (9Cl); perchloric acid, 1,2,2-trichloro-1,2-difluoroethyl ester; trifluoroacetyl chloride; trifluoromethylisocyanide ($CF_3$—NC); trifluoromethyl isocyanide; trifluoro-nitro so-ethene//trifluor-nitroso-aethen; tetrafluoroethene; 3,3,4,4-tetrafluoro-3,4-dihydro-[1,2]diazete; (difluoramino)difluoracetonitril; tetrafluorooxirane; trifluoroacetyl fluoride; sulfur hexafluoride; Nitrogen; and mixtures thereof.

BRIEF DESCRIPTION OF THE DRAWINGS

The above and other features and advantages of the present invention will become apparent from the discussion below of specific, illustrative embodiments thereof presented in conjunction with the accompanying drawings, in which.

DETAILED DESCRIPTION OF THE INVENTION

Figure 1:
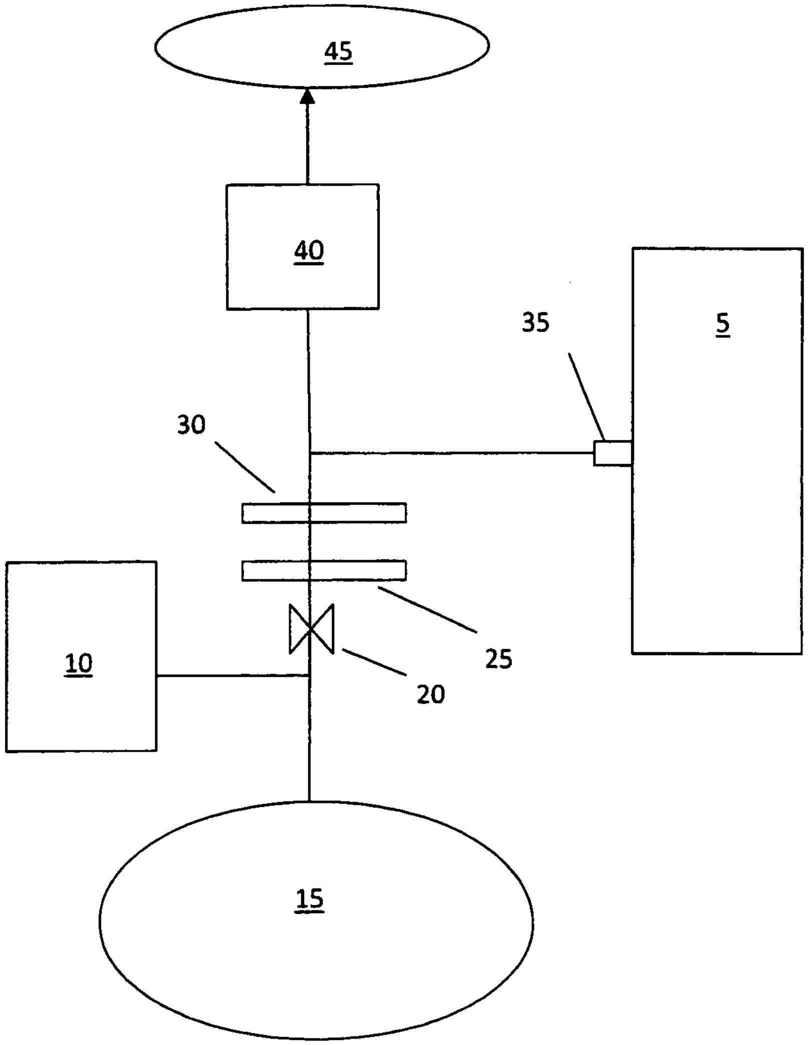
FIG. 1 is a schematic block diagram showing an embodiment of a fast recovery and charge system according to the present invention.

The present invention relates to an apparatus and method for fast recovery and charge of insulation gas in various electronic devices. FIG. 1 illustrates schematically the basic components of the invention.

Referring to FIG. 1, the insulation gas recovery and charge apparatus is connected through connect 35 to electrical equipment device 5. The connect 35 can be any type of connection means, such as a threaded male or female connection or a quick-connect device. The electrical equipment device 5 is typically a high voltage power supply and may include gas-insulated circuit breakers and current interruption equipment, gas-insulated transmission lines, gas-insulated transformers, and gas-insulated substations. When the gas recovery and charge apparatus is connected to the electrical equipment device 5, pump 10 is in communication with the electrical equipment device 5 and is capable of evacuating the electrical equipment device 5.

In order to evacuate the electrical equipment device 5, valve 20 must be selected to operate in a collection state. When valve 20 is in a collection state, pump 10 evacuates the insulation gas from the electrical equipment device 5, through an optional gas drying system 30 and an optional filter 25 into an inflatable collection device 15. The inflatable collection device 15 can be made from any gas impermeable material; however the material should be flexible to aid in the transfer of the collection device 15 both when the inflatable collection device 15 is empty and full of insulation gas. Because the inflatable collection device 15 is able to hold all or substantially all of the insulation gas contained in the electrical equipment device 5 in a gas state, the insulation gas can be quickly transferred to a second electrical equipment device without first converting the gas into a liquid storage state. Another advantage of having the insulation gas held in the gas state in collection device 15 is that routine maintenance can be performed on the electrical equipment device 5, or any instrument where the insulation gas in the electrical equipment device 5 is in communication with the instrument, without converting the insulation gas into a liquid storage state.

When the bulk of the insulation gas is removed to the collection device 15, valve 20 can be closed so that a second pump 40 can more fully evacuate the electrical device 5 to outside vent 45.

In the event the insulation gas is ready to be re-charged into the electrical equipment device 5, valve 20 is selected to operate in a charge state and pump 10 is used as a pressure pump to return the gas in the collection device 15 back to the electrical equipment device 5. When the gas recovery and charge apparatus are no longer needed the apparatus can be disconnected from electrical equipment device 5 and moved to a second electrical equipment device.

Figure 2:
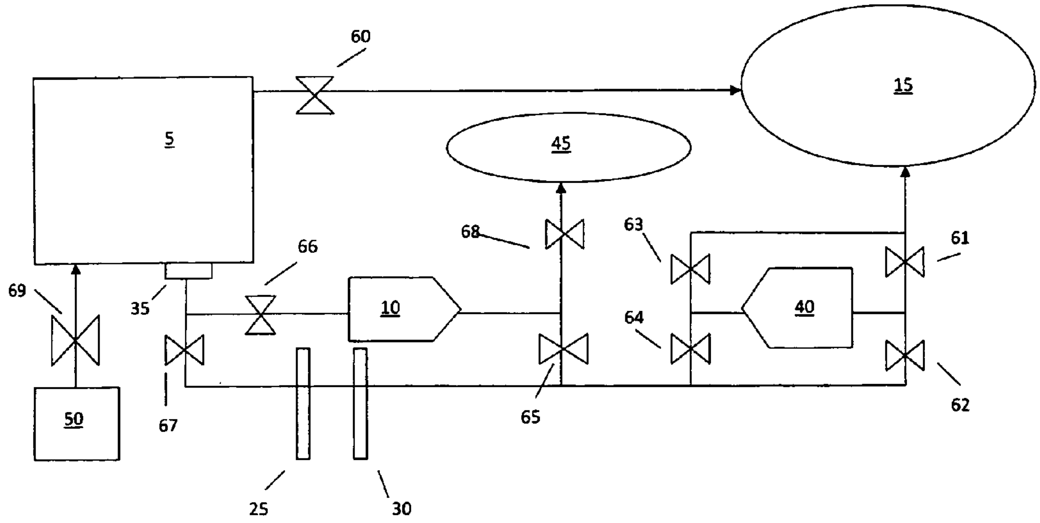
FIG. 2 is a schematic block diagram illustrating an embodiment of a fast recovery and charge system according to the present invention.

FIG. 2 represents schematically a second embodiment of the invention comprising additional valves and a relief system. Referring now to FIG. 2, initially the system can be considered to have electrical equipment device 5 fully charged with insulation gas, e.g., 10 psig of $SF_6$, and where all valves are closed and the pumps are off.

Gas recovery is initiated when valves 67, 64, 63, 62 and 61 are opened equalizing pressure between the electrical equipment device 5 and the inflatable collection device 15. When the electrical equipment device 5 is at or near 0 psig, valve 67 is closed and valves 66 and 65 are opened. When valves 66, 65, 64, 63, 62 and 61 are open the insulation gas recovery and charge apparatus is in a recovery or collection state. When pump 10 is activated insulation gas is directed from the electrical equipment device 5 to the inflatable collection device 15. The electrical equipment device 5 is evacuated to approximately 10 Torr and all valves are closed.

The electrical equipment device 5 is typically in communication with an instrument 50 that receives electrical power from the electrical equipment device 5. The instrument 50 will also contain some amount of insulation gas. Instrument valve 69 can optionally be opened to back fill the electrical equipment device 5 with instrument air. As the electrical equipment device 5 equilibrates to near 0 psig with the instrument air, the instrument valve 69 can be closed and the electrical equipment device 5 can be safely opened to the atmosphere for inspection. The electrical equipment device 5 can be optionally vented by having all valves closed and opening valves 66 and 68. Pump 10 when activated will evacuate the electrical equipment device 5 venting to the outside 45.

As the electrical equipment device 5 reaches sub-atmospheric conditions, e.g., 10 Torr, valves 66 and 68 can be closed and pump 10 can be turned off. If desired, the electrical equipment device 5 can now be recharged with insulation gas. The insulation gas recovery and charge apparatus can be selected to operate in a fill or charge state by opening valves 67, 64, 63, 62, and 61. This will cause the insulation gas in the inflatable collection device 15 to equilibrate with the electrical equipment device 5 returning the electrical equipment device 5 to near atmospheric pressure, approximately 700 Torr. At this time valves 62 and 63 can be closed, leaving open valves 67, 64 and 61, a second pump 40 can be used to evacuate the inflatable collection device 15 and thereby recharge the electrical equipment device 5 with insulation gas. When the electrical equipment device 5 reaches super-atmospheric conditions, e.g., 10 psig, all the valves can be closed, the pump can be turned off and the electrical equipment device 5 is insulated and ready for high voltage conditions. In the event the electrical equipment device 5 is overcharged, e.g., exceeding 12 psig, the system can optionally contain a relief valve 60 that can be used to return insulation gas back to the inflatable collection device 15.

Details hereinabove recited are provided to enable a fuller understanding of the invention. It will be understood, however, that such details except as required by the expressions in the claims should not be construed as a limitation of the invention.

What is claimed is:

1. An insulation gas recovery and charge apparatus comprising:
- a) a pump and a second pump;
- b) a connect for connecting said insulation gas recovery and charge apparatus to an electrical equipment device insulated with a gas;
- c) an inflatable collection device;
- d) a valve having a collection state and a charge state;
- e) wherein said valve is in communication with said inflatable collection device and said electrical equipment device when said connect is connected to said electrical equipment device; and
- f) wherein said pump is capable of directing said gas from said electrical equipment device to said inflatable collection device when said valve is in said collection state and said second pump is capable of directing said gas from said inflatable collection device to said electrical equipment device when said valve is in said charge state.

2. A method for recovery and charge of insulation gas comprising:

providing an insulation gas recovery and charge apparatus including
- a) a pump and a second pump;
- b) a connect;
- c) an inflatable collection device; and
- d) a valve including a collection state and a charge state;

connecting said gas recovery and charge apparatus through said connect to an electrical equipment device containing an insulation gas;

removing said insulation gas from said electrical equipment device by operating said pump wherein said insulation gas is collected in said inflatable collection device;

operating said pump with said valve in said collection state to direct said insulation gas from said electrical equipment device to said inflatable collection device; and operating said second pump with said valve in said charge state to direct said insulation gas from said inflatable collection device to said electrical equipment device.

3. A method for recovery and charge of insulation gas comprising:

providing a gas recovery and charge apparatus consisting of
- a) a pump and a second pump;
- b) a connect;
- c) an inflatable collection device; and
- d) a valve;

connecting said gas recovery and charge apparatus through said connect to an electrical equipment device containing an insulation gas;

removing said insulation gas from said electrical equipment device by operating said pump wherein said insulation gas is collected in said inflatable collection device; and returning said insulation gas into said electrical equipment device by operating said second pump wherein said insulation gas is removed from said collection device and returned to said electrical equipment device.

4. The method of claim 3 wherein the insulation gas recovery and charge apparatus includes a filter.

5. The method of claim 3 wherein said insulation gas is selected from the group consisting of: arsenic pentafluoride; arsine; diboron tetrafluoride; diborane; perchloric acid, 2-chloro-1,1,2,2-tetrafluoroethyl ester (9Cl); perchloric acid, 1,2,2-trichloro-1,2-difluoroethyl ester; trifluoroacetyl chloride; trifluoromethylisocyanide ($CF_3$—NC); tetrafluoroethene; 3,3,4,4-tetrafluoro-3,4-dihydro-[1,2]diazete; tetrafluorooxirane; trifluoroacetyl fluoride; sulfur hexafluoride; nitrogen.

6. The method of claim 3 wherein said inflatable collection device is constructed of flexible gas impermeable material.

7. The method of claim 3 wherein said connect is selected from the group consisting of threaded male and female connection and quick-connect device.

8. The method of claim 3 wherein said electrical equipment device is selected from the group consisting of high voltage power supply, gas-insulated circuit breaker, current interruption equipment, gas-insulated transmission line, gas-insulated transformer, and gas-insulated substation.

* * * * *